United States Patent [19]

Radulescu

[11] Patent Number: 5,419,484
[45] Date of Patent: May 30, 1995

[54] APPARATUS AND PROCESS FOR ALUMINOTHERMIC WELDING

[76] Inventor: Stefam R. Radulescu, 1130 University Ave., Palo Alto, Calif. 94301

[21] Appl. No.: 48,653
[22] Filed: Apr. 19, 1993
[51] Int. Cl.$^6$ ............................................. B23K 23/00
[52] U.S. Cl. .................... 228/234.3; 228/119; 228/198; 164/54; 104/15; 266/167; 249/86
[58] Field of Search ................ 228/119, 198, 234.3; 249/86; 164/54, 333; 104/15; 266/167

[56] References Cited

U.S. PATENT DOCUMENTS

| | | | |
|---|---|---|---|
| 2,309,288 | 1/1943 | Young | 164/54 |
| 3,620,291 | 11/1971 | Delachapelle | 228/234.3 |
| 4,247,074 | 1/1981 | Stratmann et al. | 164/54 |
| 4,605,053 | 8/1986 | Fricke | 164/54 |
| 5,078,200 | 1/1992 | Guntermann et al. | 164/54 |

*Primary Examiner*—Samuel M. Heinrich

[57] ABSTRACT

The disclosure relates to a multi-part mold for aluminothermic welding without preheating of metal parts, said mold having internally employed a welding cavity and two rising channels with variable cross-sections along their height, the central part of welding cavity being located below with respect to the lateral parts of welding cavity, said welding cavity having an increased moment of inertia of cross-section and an increased height from the lower side of base portion of welding cavity to the neutral axis of welding cavity, said rising channels extending from a region lower than said base portion, said welding cavity and said rising channels being connected together through two connecting ducts extending from the lower side of base portion to the head portion of welding cavity, the invention further relating to a process of reaching the metal parts by the liquid steel first underneath the lower side of base, a process of creating a liquid bath of constant height in an early stage of pouring operation and to a process of entirely eliminating of gases from said welding cavity, employing a weld with a ratio of the moment of fatigue of base by the moment of fatigue of head between 0.8 to 1.

28 Claims, 6 Drawing Sheets

APPARATUS AND PROCESS FOR ALUMINOTHERMIC WELDING

BACKGROUND OF THE INVENTION

1. Field of the Invention

This invention relates to an apparatus and process for aluminothermic welding without preheating of metal parts, with rising channels and central part of welding cavity controlling such process and with ventilating means for entirely eliminating of gases.

2. Prior Art

In aluminothermic welding without preheating of two or more identical or similar metal parts of variable cross-sections, such as rails, aligned in an end-to-end relation, several methods are known in which the amount of heat required to weld the rail ends is supplied solely by the liquid steel aluminothermically produced.

However, no method is known in which the stress applied to the weld head is decreased by increasing the moment of inertia of cross-section of weld and by increasing the height between the weld base and the neutral axis of weld while the moment of fatigue of weld base and the moment of fatigue of weld head are so balanced as to obtain an increase of the endurance of the resulted weld.

At the same time, a single method is known in which the area of the cross-section of a rising channel varies along said channel in such a manner that areas in the longitudinal section of different portions of a channel are proportional to areas of corresponding portions of rail.

In one such process and apparatus, described in Romania Pat. No. 80,214, the rail ends are positioned with a gap therebetween and enclosed in a welding mold, which contains stepped rising channels, connecting gates and ventilating ducts. After a casting crucible is manually tapped, a single liquid stream flows into the welding cavity centrally through the gap and fills the welding cavity and the rising channels. However, this method is subject to several disadvantages. Because the two cores used in employing the rising channels are in an interdependent relation, the rising channels are not sufficiently large in the region of rail head, and the rail head would not be properly melted. Also, technical difficulties are encountered when the stepped rising channels are to be employed with inter-dependent cores. This method requires large spaces around metal parts for eliminating of gases from the base portion and the web portion of welding cavity during the pouring operation, such that this method does not employ a weld without rib and further finishing in the region of weld web is required.

No such welding apparatus and method without preheating of rails is known in which the space around the metal parts in the region of web portion of the welding cavity is sufficiently narrow, such that a weld without rib on the sides of weld web is not employed without further finishing in the region of weld.

SUMMARY OF THE INVENTION

These disadvantages are overcome by the present invention by creating a novel apparatus, as well as a novel process. The present invention comprises a mold composed of two mold parts, said mold having internally employed a welding cavity and two rising channels with variable cross-sections along their height located on each side of welding cavity. It is an objective of the present invention to provide a mold in which the central part of the base portion of welding cavity extends from underneath the lower side of the lateral parts of base portion with the same extent as the central part of the head portion of welding cavity extens from the lower side of the lateral parts of the head portion. It is an objective of the present invention to provide a mold having a welding cavity with an increased moment of inertia of cross-section of the central part and an increased height from the lower side of the central part of base portion to the neutral axis of the central part of welding cavity. It is another objective of the present invention to obtain a balanced stress in the base portion and head portion of the resulted weld by employing a weld in which the ratio of the moment of fatigue of weld base by the moment of fatigue of weld head is between 0.8 and 1. The rising channels extend from underneath the base portion of welding cavity to the upper side of mold and the rising channels are employed directly during the molding operation. It is another objective of the present invention to greatly simplify the manufacturing process of rising channels in particular, by which the errors in employing the rising channels are completely eliminated.

The upper side of rising channels are connected directly to the atmosphere or to the upper side of head portion of the welding cavity. It is another objective of the present invention to provide closing means of the rising channels located at the lower side or at the lateral side of mold. A mold part is located at the upper side of mold. It is another objective of the present invention to provide closing gates at the upper side of rising channels, an inflow gate through which the liquid steel is poured into the welding cavity and ventilating gates of gases from the rising channels, located in the mold part which is located at the upper side of mold, by which the automated manufacturing process of mold is greatly simplified.

The welding cavity is connected with each rising channel through two connecting ducts extending from the lower side of base portion to the head portion. It is another objective of the present invention to provide ventilating means connecting the base portion with the rising channels or with the head portion or directly to the atmosphere.

The metal parts are aligned in an end-to-end relation with a gap therebetween and surrounded by the mold parts. The welding process according to the present invention is commenced by pouring liquid steel into the welding cavity. It is another objective of the present invention to reach the metal parts by the liquid steel first underneath the lower side of the base of metal parts and then on the lateral side of base of metal parts. It is another objective of the present invention to conduct the flowing liquid steel through the connecting ducts from the beginning of pouring operation, while creating in the base portion of welding cavity in an early stage of pouring operation a liquid bath of constant height, which is continuously refreshed by the pouring hot steel, the base portions of metal parts being properly melted from center to extremities. It is further another objective of the present invention to entirely eliminate through connecting ducts, which also have the role of ventilating means, the gases which develop in the base portion and the web portion during the pouring operation of liquid steel into the welding cavity.

The gases which are formed in the rising channels are evacuated through closing gates located at the upper side of rising channels and the liquid steel eventually fills the welding cavity and the rising channels. It is another objective of the present invention to solidify the liquid steel when it flows through the ventilating means connecting the base portion directly to the atmosphere. It is further another objective of the present invention to conjointly provide a process of melting the metal parts in a controlled manner and a process of entirely eliminating of gases from the welding cavity.

BRIEF DESCRIPTION OF THE DRAWINGS

The invention will be further illustrated by reference to the accompanying drawings, in which.

DETAILED DESCRIPTION OF THE INVENTION

Figure 1:
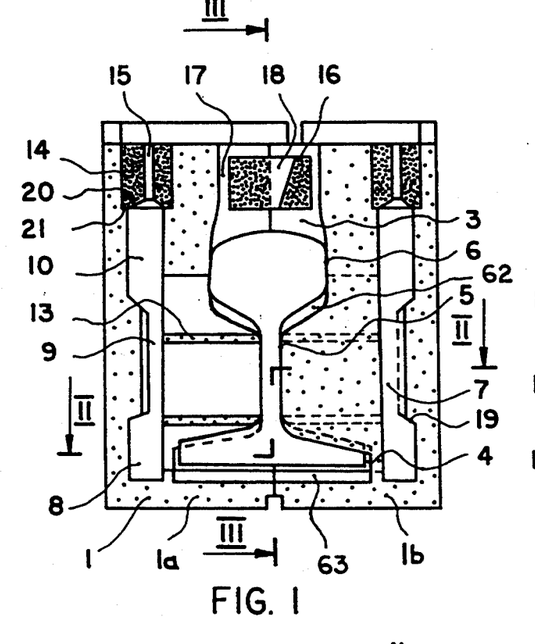
FIG. 1 is the longitudinal sectional view upon the plane I—I according to FIG. 2 of the mold of the preferred embodiment, surrounding the metal parts.

Refering to the drawings, the mold according to the preferred embodiment of the present invention for aluminothermic welding without preheating of two identical or similar metal parts of variable cross-section, having an increased moment of inertia of the cross-section of welding cavity, is shown in FIG. 1. The description is made with reference to the welding of rail ends aligned in an end-to-end relation, but this should not limit the scope or domain of application of the inventive apparatus and process.

The mold 1 is composed of two mold parts 1a and 1b made from a mixture based on quartz sand. The mold 1 has internally employed a welding cavity 3 which has a base portion 4, a web portion 5 and a head portion 6 and which closely resembles the shape of metal parts with the exception of the upper side of head portion, where the liquid steel is poured into the welding cavity.

Figure 24:
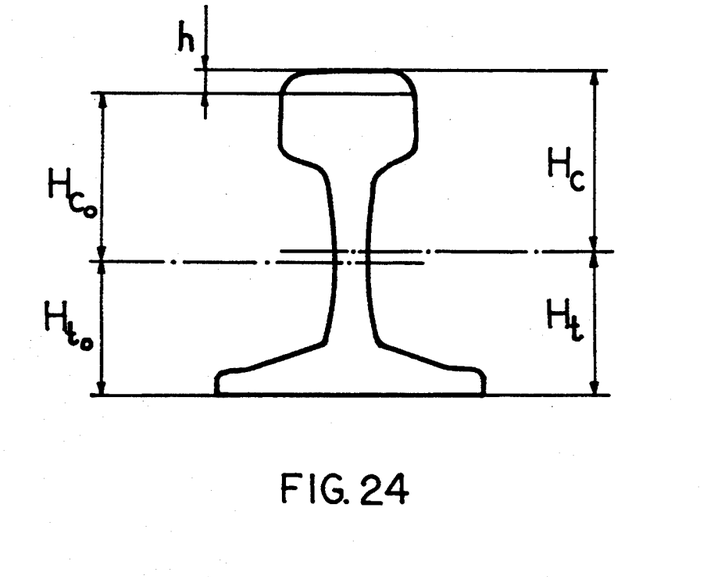
FIG. 24 is the schematic representation of the virtual downward translation of the cross-section of weld.

The central part 63 of base portion extends upwards from underneath the lower side of the lateral parts of base portion of welding cavity. The central part of head portion 62 extends from under neath the lower side of lateral parts of head portion to the upper side of lateral parts of head portion. The central part of base portion of welding cavity extends from underneath the lower side of the lateral parts of base portion of welding cavity, while the upper side of the central part of welding cavity is at the same height as the upper side of the lateral parts of welding cavity, such that the height between the lower side of the central part of base portion and the lower side of the central part of head portion is at least equal to the height between the lower side of the lateral parts of base portion and the lower side of the lateral parts of head portion, as it is shown in FIG. 24. Also, the height of the central part of web portion is substantially equal to the height of the lateral parts of web portion of welding cavity.

In order to increase the moment of inertia of the cross-section of the resulted weld, new material is virtually added at the upper side of head portion of the weld through the process of welding and it is schematically shown that the height of resulted weld is increased. Further, the resulted weld is virtually translated downwards such that the upper side of weld head is aligned to the upper side of rail head. The height of the upper side of weld head with respect to the neutral axis is given by the relation:

$$H_c = \frac{B_k \times h \times \frac{h}{2} + \Omega_0(H_{c0} + h)}{B_k \times h + \Omega_0}$$

where: $H_{c0}$ is the height of rail head with respect to the neutral axis of rail, h is the height of the new material added by the welding process $B_K$ is the width of rail head, $\Omega_0$ is the area of cross-section of rail head.

Thus, the height from the lower side of weld base to the neutral axis of resulted weld is increased and is given by the relation:

$$H_t = H + -H_c$$

where H is the height of rail.

Accordingly, the height of welding cavity is increased and the height between the lower side of the central part of base portion and the neutral axis of the central part of welding cavity is greatly increased, such that the ratio of the moment of fatigue of cross-section of the central part of base portion by the moment of fatigue of cross-section of the central part of head portion is between 0.8 to 1, and as a combined result, the endurance of the resulted weld is greatly increased.

The moment of inertia of cross-section of weld is approximated by the relation:

$$I_x = I_{x0} + (H_c - H_{c0})^2 \Omega_0 + I_x + (H_c - 2/h)^2 \Omega_a$$

where: $I_x$ is the moment of inertia of cross-section of weld, $I_{x0}$ is the moment of inertia of cross-section of rail, $I_x$ is the moment of inertia of cross-section of supplement part virtually added to the upper side of weld, $\Omega_{aC}$ is the area of cross-section of supplement part.

Thus, the moment of inertia of cross-section of weld is increased and the following relation holds:

$$I_x > I_{x0}$$

Accordingly, the moment of inertia of cross-section of the central part of welding cavity is greatly increased.

As an example, it is considered the rail of type UIC60 which has the following characteristics: height of rail H=172 mm, width of rail base BF=150 mm, width of rail head $B_K$=74.3 mm. A simplified calculus yields that the height from the lower side of rail base to the neutral axis of rail is $H_{t0}$=81 mm, while $H_t$=88 min. Also, a simplified calculus yields that the moment of inertia of cross-section of weld increases:

$$I_x - I_{x0} = 3515\ cm^4 - 3055\ cm^4 = 460\ cm^4$$

The moment of fatigue of the weld head is given by the relation:

$$M_{obc} = \sigma_{obc} \times W_{xc}$$

where: $\sigma_{obc}$ is the stress of fatigue of weld head, $W_{xc}$ is the modulus of toughness of weld head.

It is considered that:

$$M_{obc} M_{obadm}$$

where $M_{obadm}$ is the allowable moment of fatigue of steel aluminothermically produced.

The stress of fatigue of weld head is:

$$\sigma_{obc} = \frac{M_{obadm}}{H \times \Delta u}$$

where $\Delta \mu$ is the element of area.

The moment of fatigue of the cross-section of weld and accordingly, of the cross-section of welding cavity, is:

$$M_{ob} = \sigma_{obc} \times W_x$$

and the stress of fatigue of weld base and accordingly, of base portion of welding cavity, is:

$$\sigma_{obt} = \frac{M_{ob}}{W_{xt}}$$

where $W_{xt}$ is the modulus of weld base.

The moment of fatigue of weld base is given by the relation:

$$M_{obt} = \sigma_{obt} \times H_t \times \Delta \mu$$

Finally, the ratio between-the moment of fatigue of weld base and the moment of fatigue of weld head is:

$$\frac{M_t}{M_c} = \frac{\sigma_{obt} \times H}{\sigma_{obt} \times H}$$

It has been discovered that when:

$$0.8 < \frac{M_t}{M_c} < 1$$

the endurance of the resulted weld is greatly increased.

Accordingly, the ratio between the moment of fatigue of cross-section of the central part of base portion and the moment of fatigue of cross-section of the central part of head portion is between 0.8 to 1, and as a combined result, the endurance of the resulted weld is greatly increased.

Alternatively, the moment of fatigue given by the load of fatigue is given by the relation:

$$M_{ob} = \frac{P_{ob} \times l}{4}$$

where $P_{ob}$ is the load of fatigue, l is the distance between supports.

The reaction of the weld head to the applied moment of fatigue is given by the relation:

$$M_{ob} = \sigma_{ob} \times W_{xc}$$

Finally, the load of fatigue is given by the relation:

$$P_{ob} = \frac{4 \times M_{obadm} \times W}{l \times H_c \times \Delta u}$$

It is obtained that for a constant number of fatigue cycles N, the allowed moment of fatigue remains constant, and thus, the load of fatigue increases by increasing the modulus of toughness. For a welding material with the following characteristics: ultimate stress or $\sigma_r$=90 Kg/mm², stress of fatigue $\sigma_{ob}$=20 Kg/mm² for a number of fatigue cycles $N=2.1\times 10^6$ cycles, it has been experimentally discovered that the allowed moment of fatigue is $$M_{ob\ dm} = 1520\ Kg \times mm.$$

Again, for the rail of type UIC60 it has been obtained a new load of fatigue $P_{ob}=25.2$ tones compared to the initial load of fatigue $P_{ob0}=22.4$ tones applied for the same number of fatigue cycles $N=2.1\times 10^6$ cycles. This represents an increase of 12.5% of the load of fatigue for the same number of fatigue cycles.

Similarly, by increasing the profile of the resulted weld both at the base and head of weld, a decrease of the stress of weld is obtained because of increasing the modulus of toughness of weld. This results directly in a great increase of the endurance of weld. Alternatively, maintaining constant the number of cycles of fatigue, an increase of the load of fatigue is obtained.

Figure 2:
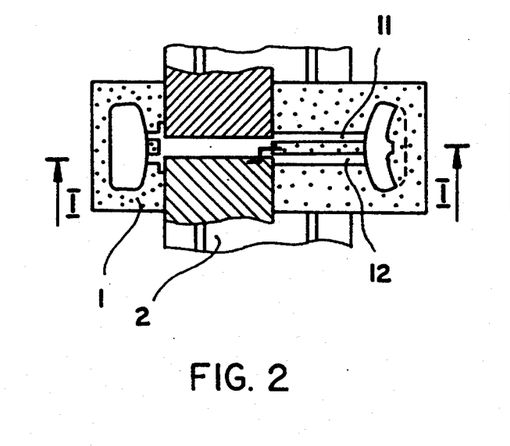
FIG. 2 is the transversal sectional view upon the plane II—II according to FIG. 1.

The mold has further internally employed two rising channels 7 with cross-sections of elongated shape on a direction parallel to the transversal axis of mold, as shown in FIG. 2. A consequent result is that the length of mold is greatly reduced, and this is particularly useful when the mold is employed in performing welds in narrow spaces. The rising channels 7 are located at the extremities of welding cavity, on each side of the welding cavity and which extend from underneath the base portion 4 of welding cavity to the upper side of mold. The rising channels have variable cross-sections along their height and are composed of channel portions 8, 9, and 10 which are volumetrically matched with correspondent portions of the welding cavity.

The channel portions matched with the web portion are employed directly during the molding operation. Additionally, the passage 19 between the two consecutive channel portions 8 and 9 is gradually employed. As a combined result, the manufacturing process of mold is greatly simplified.

The welding cavity is connected with each of the rising channels through one connecting duct 11 and one connecting duct 12. The connecting ducts extend from the lower side of base portion to the head portion of welding cavity and they also have the role of ventilating means through which especially the base portion is connected with the rising channels. The connecting ducts 11 and 12 are located symmetrically with respect to the longitudinal axis of mold 1.

Figure 3:
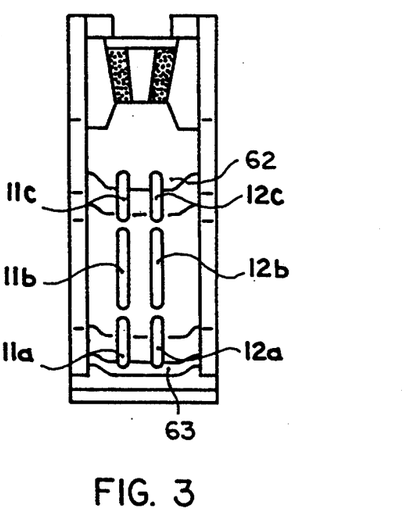
FIG. 3 is the internal lateral view of a mold part of the preferred embodiment and the vertical sectional view upon the plane III—III according to FIG. 1, through the guiding core.

The connecting ducts are employed in a distributed manner from connecting portions 11a, 11b, 11c and 12a, 12b, 12c, respectively, separated by horizontal separating means 13, as shown in FIG. 3. The width of connecting ducts is between 1:20 to 1:1 of the height of base portion of the welding cavity at the extremities of base portion. The width of connecting ducts is slightly increased in the vecinity of welding cavity 3, not shown, uniformly on the entire height of connecting ducts.

Figure 4:
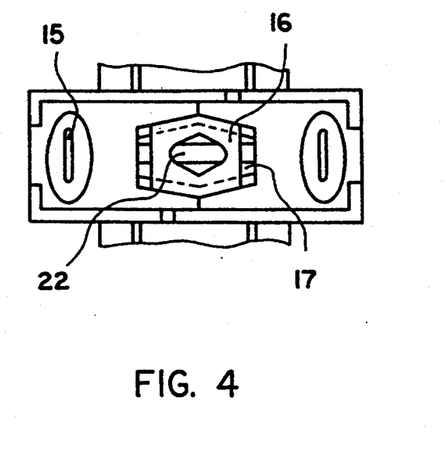
FIG. 4 is the top view of the mold of the preferred embodiment, surrounding the metal parts.

One core 14 is located at the upper side of each of rising channels 7 on positioning means 21, such that each of the rising channels is connected directly to the atmosphere through one closing gate 15 with the cross-section of elongated shape, as shown in FIG. 4. Thus, the errors in employing the rising channels are completely eliminated while the manufacturing process of the mold is greatly simplified. The passage 20 between the upper side of rising channels 7 and the closing gates 15 is gradually employed. The cores 14 are secured in a known manner against rising in the rising channels.

One guiding core 16 is centrally located at the upper side of mold 1 and it has internally employed one inflow gate 18 through which the liquid steel is poured into the welding cavity. The upper side of head portion of the welding cavity is connected directly to the atmosphere through the ventilating gates 17, which are employed between the core 16 and the walls of mold.

The metal parts 2 are aligned in an end-to-end relation with a gap 22 therebetween and are surrounded by the mold parts 1a and 1b. More specifically, the gap of metal parts is surrounded by the central part of welding cavity. The welding process of the invention is commenced by manually tapping a casting crucible placed above the mold when the aluminothermic reaction is completed. Pouring of liquid steel into the welding cavity 3 is employed directly, with a flow which is entirely allowed by the area of cross-sections of the connecting ducts 11 and 12, as well as by the area of cross-sections of inflow gate 18 located at the upper side of head portion of the welding cavity 3. The liquid steel flows to the region of rail base and to the rising channels. The liquid steel fills the lower side of the central part of base portion and then reaches the metal parts first underneath the lower side of base of metal parts, whereby the heat transfer between the flowing liquid steel and the base of metal parts is greatly increased and the lower side of base of metal parts is properly melted from center to extremeties.

Because the connecting ducts 11 and 12 extend from the lower side of base portion of the welding cavity 3 at the extremities of welding cavity, the liquid steel flows through the connecting ducts from the beginning of pouring operation and the cooled liquid steel is replaced by the pouring liquid steel. Furthermore, the width of connecting ducts is between 1:20 to 1:1 of the height of base portion 4 of the welding cavity at the extremities of base portion, such that to allow only a part of pouring liquid steel to flow to the rising channels 7 at the beginning of pouring operation, while the rest of liquid steel accumulates in the welding cavity 3 in the form of a liquid bath.

As the liquid steel is further poured into the welding cavity, the height of liquid bath rises, which results in a gradual increase of the cross-section of liquid steel flowing through the connecting ducts. The liquid steel flows through the connecting ducts 11 and 12 to the rising channels with a variable increasing discharge flow until the discharge flow equals the incomming flow of liquid steel into the welding cavity. The discharge flow varies from zero to the value of incomming flow, while the height of liquid bath increases more rapidly than the height of liquid steel in the lower side of rising channels, and a liquid bath of constant height is created in the base portion of welding cavity in an early stage of pouring operation. The height of liquid bath in the base portion is between 1:20 to 1:1 of the height of base portion at the extremities of base portion. The liquid steel then flows with a constant discharge flow until the height of liquid steel from the lower side of rising channels equals the height of liquid bath in the welding cavity, and then the discharge flow remains constant until the end of pouring operation. Further the liquid steel flows with a constant discharge flow and with a cross-section of constant height through the connecting ducts, until the height of liquid steel in the lower side of rising channels equals the height of liquid bath in the welding cavity. Thus, in an early stage of pouring operation, which is a period of time sufficiently long, the height of liquid bath is constant while the liquid bath is continuously refreshed by the pouring hot steel, and the rail base is continuously washed entirely from center to extremities on a height equal with the height of extremities of rail base. Cosequently, the heat transfer between the liquid steel and the rail base is greatly increased and the rail base is properly melted on its entire length. Further the discharge flow through the connecting ducts remains constant and the liquid steel rises simultaneously in the welding cavity, rising channels and connecting ducts until the end of pouring operation, when the welding cavity is completely filled with liquid steel.

During the pouring operation, gases develop in the welding cavity and in the rising channels. The process of entirely eliminating of gases which develop in the base portion and in the web portion of welding cavity during the pouring operation of liquid steel into the welding cavity is employed through the connecting ducts 11 and 12 to the rising channels 7. Thus, the connecting ducts also have the role of ventilating means. Eliminating of gases from the upper side of rising channels, as well as from the entire height of rising channels 7, through the closing gates 15 directly to the atmosphere is greatly simplified. Eliminating of gases from the head portion of welding cavity is employed through the ventilating gates 17 directly to the atmosphere.

The welding cavity with modified geometry directly controls the process of melting the rail ends from the welding cavity, employing a weld having reinforcements underneath the base and the head of metal parts, whereby the moment of inertia of cross-section of the resulted weld is greatly increased and the height between the lower side of the weld base and the neutral axis of the weld is greatly increased, such that the ratio between the moment of fatigue of cross-section of the weld base and the moment of fatigue of cross-section of weld head is between 0.8 to 1, and as a combined result, the endurance of the resulted weld is greatly increased.

Having cross-sections of variable area along their heights, the rising channels directly control the process of melting the rail ends from the welding cavity, hereby the height of liquid bath from the welding cavity, as well as the height of liquid steel in the rising channels, increases with a speed inversely proportional with the area of cross-sections of the portions of rail ends. Thus, the amount of heat received by bigger portions of rail ends is greater than the amount of heat received by smaller portions of rail ends.

The closing gates 15 are sufficiently narrow, such that the cooled liquid steel solidifies when it flows through the closing gates, with the result that the same amount of steel accumulates in each rising channel. Therefore, the extremities of rail base receive the same amount of heat even when the vertical axis of mold deviates from the vertical, and this is particularly useful in employing welds in elevated track, as it is the case in curves.

Because of the horizontal separating means, the additive metal parts into which the connecting ducts result after the cooling process of liquid steel are discontinuous, and the removing operation of the additive metal parts is greatly simplified. Furthermore, because the width of connecting ducts is slightly increased in the vecinity of welding cavity, the removing operation of the additive metal parts does not negatively affect the resulting weld. As a combined result, a weld without rib is employed, after removing the additive metal parts, at least on the upper side and lateral side of weld base, on the entire height of the lateral side of weld web and on the lower side of weld head without further finishing in the region of weld.

The process of melting the rail ends directly controlled by the welding cavity with modified geometry and by the rising channels with variable cross-section along their height, the process of creating in the welding cavity a liquid bath of constant height in an early stage of pouring operation of liquid steel into the welding cavity and the process of entirely eliminating of gases which develop in the welding cavity, and particularly in the base portion of welding cavity, together effectively employ a homogenuous weld of the two rail ends, wherein the depth on which the rail ends are melted is directly proportional with the area of cross-sections of the portions of rail ends, after the liquid steel is cooled in the welding cavity.

Figure 5:
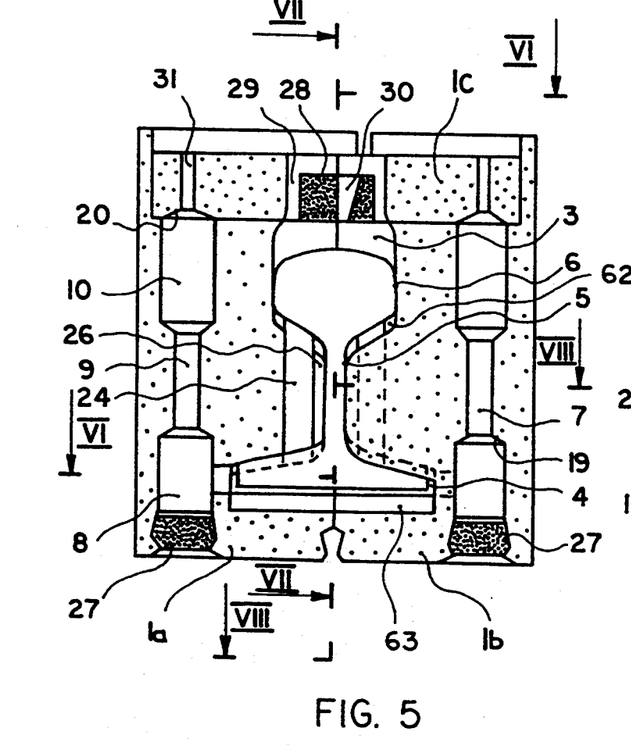
FIG. 5 is the longitudinal sectional view upon the plane V—V according to FIG. 6 of the mold of an alternate embodiment, surrounding the metal parts.
Figure 6:
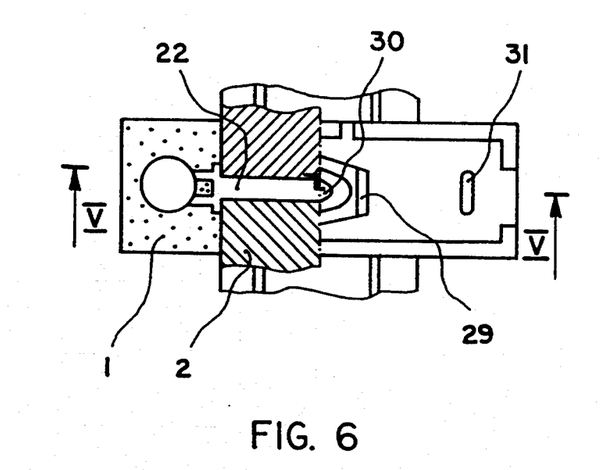
FIG. 6 is the half-sectional view upon the plane VI—VI according to FIG. 5.

An alternate embodiment of the present invention is shown in FIG. 5. The mold 1 is composed of the mold parts 1a, 1b, 1c and has internally employed two rising channels 7 with cross-sections of regular shape connected with the base portion of welding cavity, as shown in FIG. 6. One of the mold parts is located at the upper side of mold, such that one inflow gate 30 through which the liquid steel is poured into the welding cavity 3 is located at the upper side of mold 1, in the mold part 1c. The upper side of rising channels 7 is delimitated by the mold part 1c located at the upper side of mold and the upper side of each of the rising channels is connected directly to the atmosphere through one closing gate 31 with the cross-section of elongated shape. The closing gates are as well located in the mold part 1c, by which the manufacturing process of mold is greatly simplified. The ventilating gates 29, connecting the upper side of head portion 6 directly to the atmosphere, are located in the mold part 1c and are formed between the closing core 28 and the walls of mold part 1c.

Figure 7:
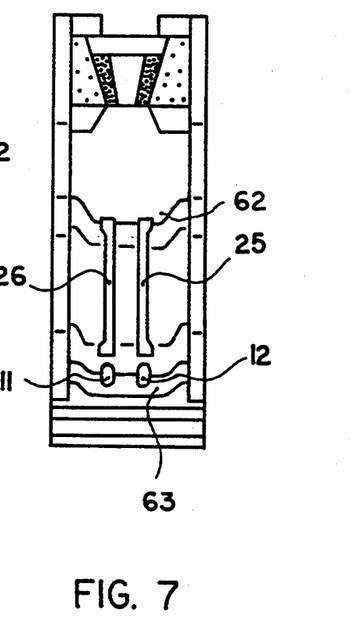
FIG. 7 is the internal, lateral view of a mold part of an alternate embodiment and the vertical sectional view upon the plane VII—VII according to FIG. 5, through the mold part located at the upper side of mold.

The extremities of base portion 4 of the welding cavity 3 each of the rising channels 7 are connected through one connecting duct 11 and one connecting duct 12 with cross-sections of elongated shape on the vertical, as shown in FIG. 7.

Figure 8:
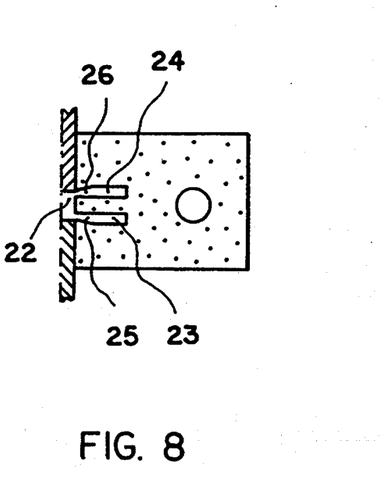
FIG. 8 is the partial sectional view upon the plane VIII—VIII according to FIG. 5.

The upper side of base portion 4 is directly connected with the lower side of head portion 6 through one ventilating duct 23 and one ventilating duct 24, located on each side of welding cavity, as shown in FIG. 8. The ventilating ducts are connected on their entire height with the welding cavity through connecting means 25 and 98 with the width smaller than the width of ventilating ducts. The ventilating ducts 23 and 24 together with the connecting means 25 and 26 form ventilating means connecting the base portion 4 with the head portion 6.

Closing means of the rising channels 7, such as, but not limited to, cores 27, are located at the lower side of rising channels. More specifically, the cores 27 are located underneath rising channels and they close spaces required by the technological operation of employing the rising channels, by which the lower side of rising channels is obturated to the atmosphere. The cores 27 are secured in a known manner against rejecting from the mold, such that the lower side of rising channels is effectively sealed to prevent the leaking of liquid steel.

The welding process is similar to the process described in the preferred embodiment. Pouring of liquid steel is employed with a flow which is entirely allowed by the area of cross-sections of the connecting ducts 11 and 12. Because the rising channels extend from underneath the base portion 4 of welding cavity and the connecting ducts have cross-sections of elongated shape on the vertical, a liquid bath of constant height is created in the welding cavity in an early stage of pouring operation. Thus, in an early stage of pouring operation, which is a period of time sufficiently long, the height of liquid bath is constant while the liquid bath is continuously refreshed by the pouring hot steel, and the rail base is continuously washed entirely from center to extremities on a height equal with the height of extremities of rail base.

The process of entirely eliminating of gases which develop in the base portion and in the web portion during the pouring operation of liquid steel into the welding cavity is employed through the ventilating ducts 23 and 24 and through the connecting means 25 and 26. The pouring liquid steel eventually fills the welding cavity, the connecting means, the ventilating ducts and the rising channels. Because of the geometry of ventilating ducts and connecting means, which form the ventilating means, the removing operation of the additive metal parts into which the ventilating means result after the cooling process of liquid steel is greatly simplified without negatively affecting the resulting weld and, after removing the additive metal parts, a weld without rib is employed on the upper side and lateral side of base of the metal parts, on the entire height of the lateral side of web of metal parts and on the lower side of head of metal parts without further finishing in the region of weld.

Figures 9, 11:
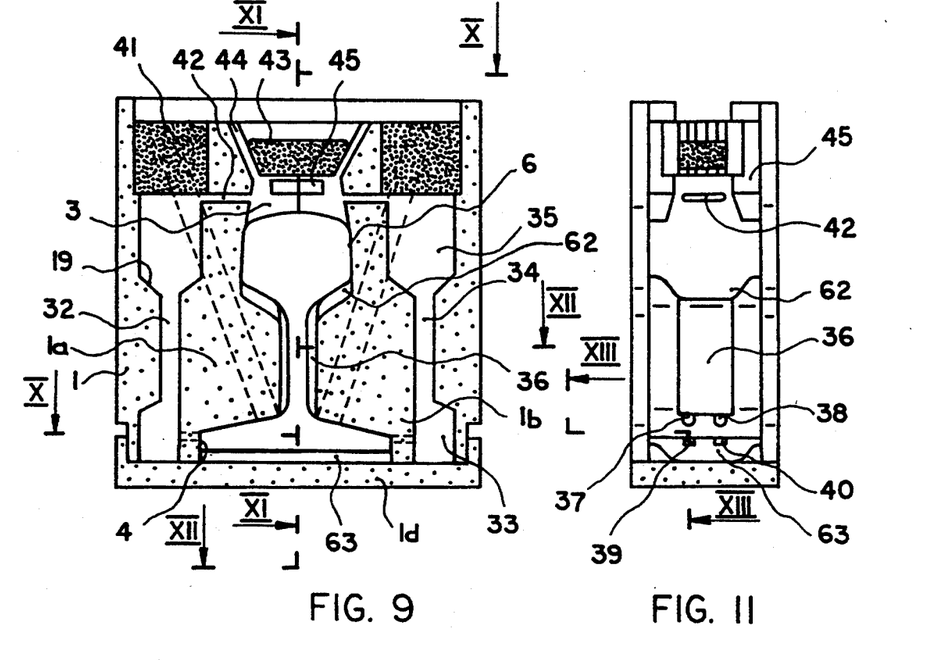
FIG. 9 is the longitudinal sectional view upon the plane IX—IX according to FIG. 10 of the mold of another alternate embodiment, surrounding the metal parts.
FIG. 11 is the internal lateral view of a mold part of an alternate embodiment and the vertical sectional view upon the plane XI—XI according to FIG. 9, through the guiding core and the mold part located at the lower side of mold.
Figure 10:
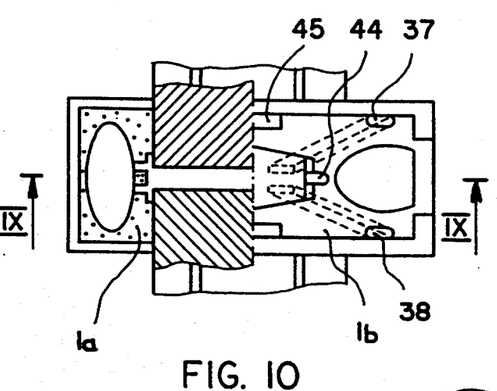
FIG. 10 is the half-sectional view upon the plane X—X according to FIG. 9.
Figure 12:
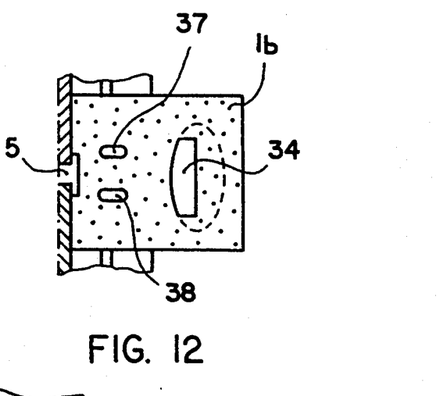
FIG. 12 is the partial sectional view upon the plane XII—XII according to FIG. 9.

Another alternate embodiment of the present invention is shown in FIG. 9. The mold 1 is composed of mold parts 1a, 1b, 1d and it has internally employed two rising channels 32, which extend from the lower side of base portion 4 of welding cavity to the upper side of mold. The mold part 1d is located at the lower side of mold and, it has the role of closing means of the lower side of rising channels and of the lower side of base portion. The channel portions 33 and 85 of each of the rising channels 82 have cross-sections of elongated shape on reciprocal orthogonal directions, such that the cross-sections of channel portions matched with the head portion 6 of welding cavity are oriented on a direction parallel with the longitudinal axis of mold, as shown in FIG. 10. The channel portions 84 matched with the web portion 5 are similarly oriented as the channel portion 38, as shown in FIG. 12.

The central part of the base portion extends entirely to the upper side of the lateral parts of base portion, such that the height of the central part of web portion is smaller than the height of the lateral parts of web portion of welding cavity.

Figure 13:
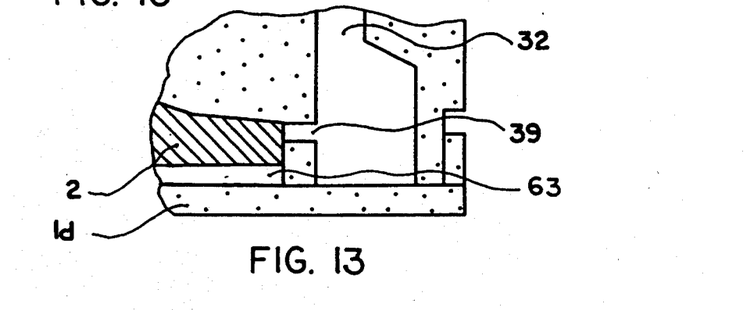
FIG. 13 is the partial sectional view upon the plane XIII—XIII according to FIG. 11, through a connecting duct.

Each of the rising channels and the upper side of head portion 6 of the welding cavity 3 are connected through one closing gate 42 with the cross-section of elongated shape on the horizontal. One closing core 41 is located at the upper side of each of the rising channels, such that the rising channels are obturated directly to the atmosphere. The extremities of base portion 4 of welding cavity and each of the rising channels are connected through one connecting duct 39 and one connecting duct 40 with the cross-section of regular shape, located symmetrically with respect to the longitudinal axis of mold, as shown in FIG. 11. The connecting ducts extend partially between the lower side of base portion and the upper side of base portion at the extremities of base portion. More specifically, the connecting ducts 39 and 40 are located at the upper side of base portion, as shown in FIG. 13. The mold has internally employed one ventilating duct 37 and one ventilating duct 38 with the cross-section of elongated shape, located on each side of welding cavity. The ventilating ducts have the role of ventilating means connecting the base portion of welding cavity, namely the upper side of base portion of the welding cavity, in the region of vertical projection of the extremities of head portion upon the upper side of base portion, directly to the atmosphere. A space 36 sufficiently narrow is formed around the metal parts in the region of web portion 5. The mold parts 1a and 1b conjointly form two ventilating gates 45, which connect the upper side of head portion of the welding cavity directly to the atmosphere.

The welding process is similar to the process described in the preferred embodiment. However, pouring of liquid steel into the welding cavity 3 is employed indirectly, with a flow which is entirely allowed by the area of cross-sections of the connecting ducts 39 and 40, as well as by the area of cross-sections of the inflow gates 44 located at the upper side of head portion 6. The liquid steel is divided by the dividing core 43 into two stream halves which flow through the inflow gates 44 and join in the region of rail head. Then the liquid steel flows to the region of rail base and to the rising channels. Because the connecting ducts 39 and 40 are located at the upper side of base portion 4, at the beginning of pouring operation the liquid steel accumulates in the welding cavity in the form of a liquid bath. When the height of liquid bath reaches the height of connecting ducts, the liquid steel begins to flow through the connecting ducts to the rising channels with a constant discharge flow until the height of liquid steel in the lower side of rising channels equals the height of liquid bath in the welding cavity. Thus, in an early stage of pouring operation, which is a period of time sufficiently long, the height of liquid bath is constant while the liquid bath is continuously refreshed by the pouring hot steel, and the rail base is continuously washed entirely from center to extremities. Further the discharge flow through the connecting ducts remains constant and the liquid steel rises simultaneously in the welding cavity, rising channels and ventilating ducts. The liquid steel solidifies when it rises through the ventilating ducts 37 and 38.

The process of entirely eliminating of gases, which develop in the base portion and the web portion of welding cavity, during the pouring operation of liquid steel into the welding cavity, is employed through the ventilating ducts 37 and 38 directly to the atmosphere and through the space 36 to the head portion. The gases from the upper side of rising channels, as well as from the entire height of rising channels, are eliminated through the closing gates 42 to the upper side of head portion. Eliminating of gases from the head portion of welding cavity is employed through the ventilating gates 45. The pouring liquid steel eventually fills the welding cavity and the rising channels. Because the ventilating ducts are sufficiently narrow, the removing operation of additive metal parts into which the ventilating ducts result after the cooling process of liquid steel is greatly simplified anti a weld without rib on the sides of weld web.

Figure 14:
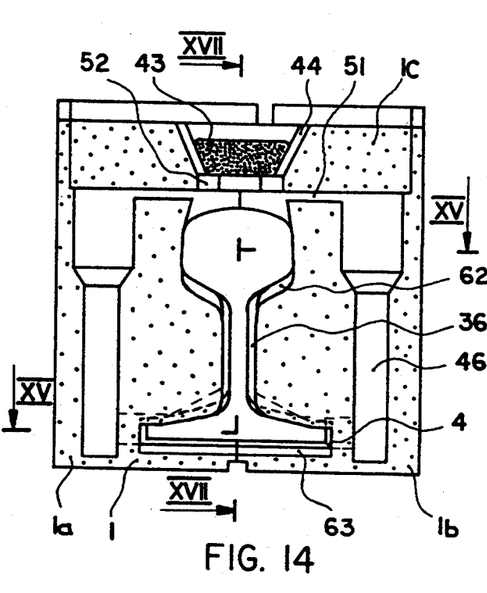
FIG. 14 is the longitudinal sectional view upon the plane XIV—XIV according to FIG. 15 of the mold of another alternate embodiment, surrounding the metal parts.
Figure 15:
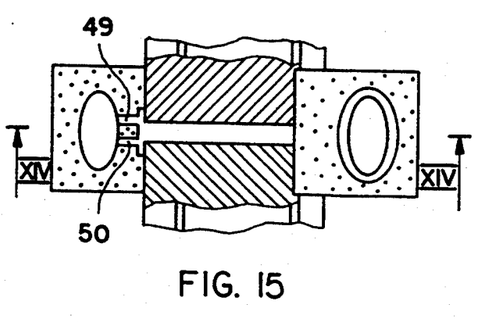
FIG. 15 is the transversal sectional view upon the plane XV—XV, according to FIG. 14.

Another alternate embodiment of the present invention is shown in FIG. 14. The mold I is composed of mold parts 1a, 1b, 1c and has internally employed two rising channels with cross-sections of elongated shape, as shown in FIG. 15. The lower side of rising channels 46 is obturated to the atmosphere directly during the pouring operation. The channel portions matched with the web portion and the channel portions matched with the base portion have identical cross-sections, the height of channel portions matched with the base portion being sufficiently big, such that these channel portions are volumetrically matched with the base portion 14.

Figure 17:
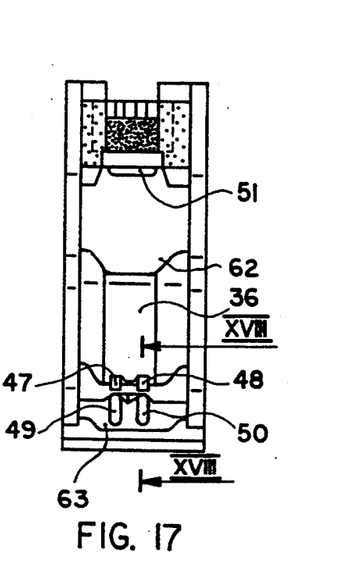
FIG. 17 is the internal lateral view of a mold part and the vertical sectional view upon the plane XVII—XVII according to FIG. 14 of the mold part located at the upper side of mold.

One recess 47 and one recess 48 are located on each side of the welding cavity in the region between the base portion and the web portion, symmetrically with respect to the longitudinal axis of mold, as shown in FIG. 17. The recesses extend partially upon the upper side of base portion and partially upon the lateral side of web portion and also partially upon the width of welding cavity. Additionally, a space 36 sufficiently narrow is formed around the metal parts in the region of web portion.

Figure 18:
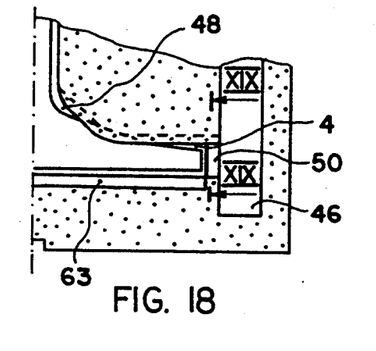
FIG. 18 is the partial sectional view upon the plane XVIII—XVIII according to FIG. 17, through a connecting duct.
Figure 19:
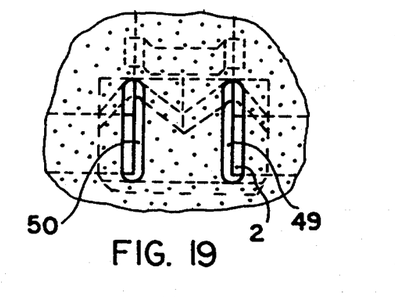
FIG. 19 is the partial sectional view upon the plane XIX—XIX according to FIG. 18, through a connecting duct.

The extremities of base portion of the welding cavity and each of the rising channels 46 are connected through one connecting duct 49 and one connecting duct 50 with the cross-section of elongated shape on the vertical. The height of base portion of the welding cavity is substantially constant from the region of vertical projection of the extremities of head portion upon the upper side of base portion to the extremities of base portion of the welding cavity in the region of connecting duct 49 and in the region of connecting duct 50. The height of connecting ducts is equal with the height of base portion at the extremities of base portion 4, as shown in FIG. 18. The height of base portion of the welding cavity is variable decreasing from the region of vertical projection of the extremities of head portion upon upper side of base portion to the extremities of base portion, in the region between the connecting ducts and the edges of base portion and in the region between the two connecting ducts 49 and 50 which connect the extremities of base portion of the welding cavity and the rising channels 46, as shown in FIG. 19.

Figure 16:
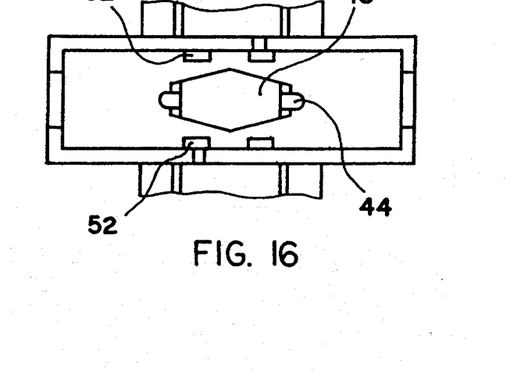
FIG. 16 is the top view of the mold of another alternate embodiment, surrounding the metal parts.

The mold part 1c is located at the upper side of mold, such that inflow gates 44 through which the liquid steel is poured into the welding cavity 3 are located at the upper side of mold 1, in the mold part 1c. The upper side of rising channels 46 is delimitated by the mold part 1c located at the upper side of mold and also the upper side of each of rising channels is connected with the upper side of head portion through one closing gaze 51 with the cross-section of elongated shape on the horizontal. The mold parts 1a, 1b and 1c conjointly form the closing gates 51, by which the manufacturing process of mold is greatly simplified. The ventilating gates 52, connecting the upper side of head portion directly to the atmosphere, are located in the mold part 1c, as shown in FIG. 16.

The welding process is similar to the process described in he preferred embodiment. Because the rising channels extend from underneath the base portion of welding cavity and the width of each connecting duct is between 1:25 to 1:1 of the height of base portion at the extremities of base portion, a liquid bath of constant height is created in the base portion of welding cavity in an early stage of pouring operation of liquid steel into the welding cavity. The height of liquid bath in the base portion is between 1:20 to 1:1 of the height of base portion in the region of vertical projection of the extremities of head portion upon the upper side of base portion. The process of entirely eliminating of gases which develop in the central region of base portion of the welding cavity during the pouring operation of liquid steel into the welding cavity is employed through the recesses 47 and 48 and the space 36 to the head portion, by which a weld without rib on the sides of weld web. Because of the geometry of extremities of the upper side of base portion 4, the process of entirely eliminating of gases which develop in the region of extremities of the base portion, during the pouring operation of liquid steel into the welding cavity, is employed through the connecting ducts 49 and 50 to the rising channels 46.

Figure 20:
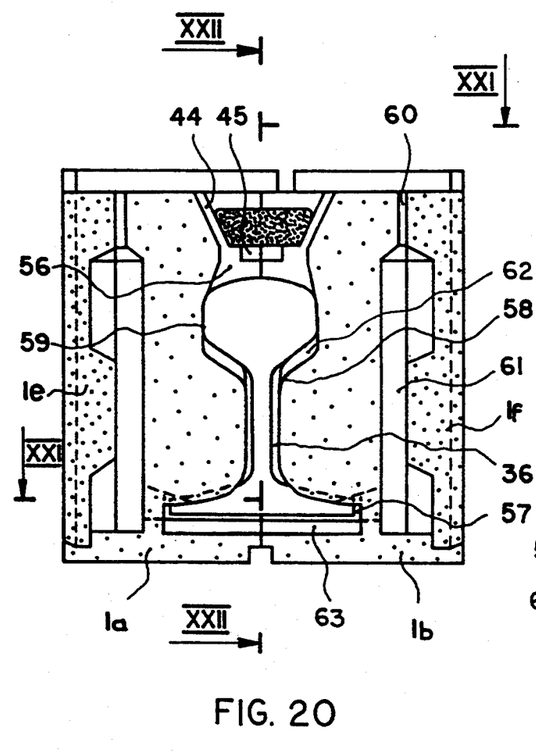
FIG. 20 is the longitudinal sectional view upon the plane XX—XX according to FIG. 21 of the mold of another alternate embodiment, surrounding the metal parts.

Another alternate embodiment of the present invention is shown in FIG. 20. The mold 1 is composed of two mold parts 1a, 1b and two mold parts 1e, 1f and has internally employed two rising channels 61 which have cross-sections of elongated shape. The rising channels have variable cross-sections along their height and are composed of channel portions which are volumetrically matched with the portions of welding cavity.

Figure 22:
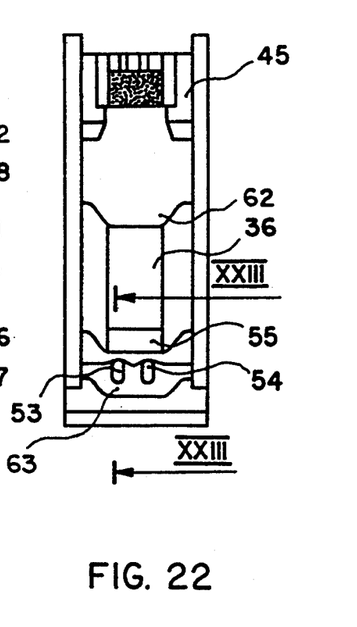
FIG. 22 is the internal lateral view of a mold part and the vertical sectional view upon the plane XXII—XXII according to FIG. 20, through the guiding core.

One recess 55 is located on each side of the welding cavity in the region between the base portion and the web portion, symmetrically with respect to the longitudinal axis of mold, as shown in FIG. 22. The recess extends partially upon the upper side of base portion and partially upon the lateral side of web portion and also entirely upon the width of welding cavity. Additionally, a space 36 sufficiently narrow is formed around the metal parts in the region of web portion 58.

Figure 23:
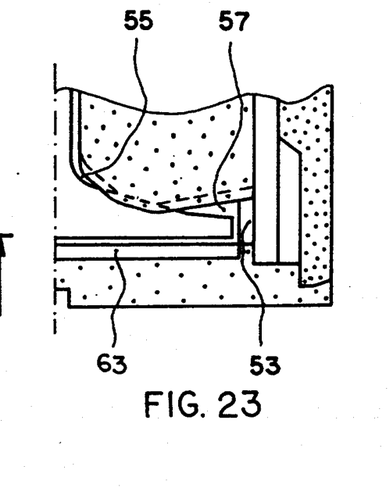
FIG. 23 is partial sectional view upon the plane XXIII—XXIII, according to FIG. 22.

The extremities of base portion 57 of the welding cavity 56 and the rising channels 61 are connected together through one connecting duct 53 and one connecting duct 54. The height of base portion 57 of the welding cavity 56 is variable increasing from the region of vertical projection of the extremities of head portion 59 upon the upper side of base portion to the extremities of base portion, in the region of connecting duct 53 and in the region of connecting duct 54, as shown in FIG. 23. The height of connecting ducts is equal with the height of base portion at the extremities of base portion.

Figure 21:
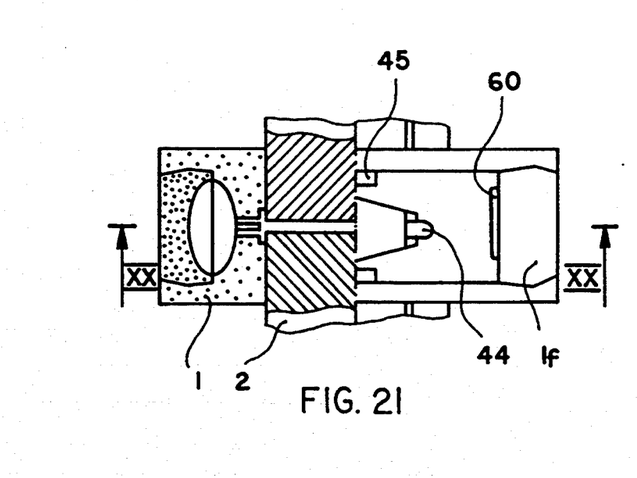
FIG. 21 is the half-sectional view upon the plane XXI—XXI according to FIG. 20.

The mold parts 1e and 1f are located at the lateral side of mold and also at the lateral side of rising channels and they have the role of closing means of the rising channels, extending from the lower side of rising channels to the upper side of mold, by which the automated manufacturing process of mold is greatly simplified. The mold parts 1a and 1e and the mold parts 1b and 1f, respectively, conjointly form the closing gates 60. Each of the rising channels is connected directly to the atmosphere through one closing gate 60 with the cross-section of elongated shape, as shown in FIG. 21. The mold parts 1a and 1b conjointly form two ventilating gates 45, which connect the upper side of head portion of the welding cavity directly to the atmosphere.

The welding process is similar to the process described in the preferred embodiment. The process of entirely eliminating of gases which develop in the central region of base portion of the welding cavity during the pouring operation of liquid steel into the welding cavity is employed through the recesses 55 and the space 36 to the head portion. Because of the geometry of extremities of the upper side of base portion 57, the process of entirely eliminating of gases which develop in the region of extremities of the base portion, during the pouring operation of liquid steel into the welding cavity, is employed through the connecting ducts 53 and 54 to the rising channels 61.

Although several embodiments of the invention have been illustrated in the accompanying drawings and described in the foregoing Detailed Description, it will be obvious to those skilled in the art that the invention is not limited to the embodiments disclosed, but is capable of many rearrangements, modifications and substitutions of parts and elements without departing from the scope and spirit of the invention, and the invention includes all such rearrangements, modifications and substitutions.

What is claimed is:

1. A mold for aluminothermic welding without preheating of similar metal parts, said mold being composed of at least two mold parts which are joined together and having internally employed a centrally-located welding cavity, wherein said welding cavity has a base portion, a web portion and a head portion and is configured to accept the metal parts aligned in an end-to-end relation with a gap therebetween, said mold in which said welding cavity includes at least a central part and lateral parts upon a direction parallel with a longitudinal axis of said mold, wherein said central part of said welding cavity surrounds the gap, said mold further having internally employed at least two rising channels located at extremities of said welding cavity on each side of said welding cavity, wherein said welding cavity is not intersected by vertical projections of said rising channels, said rising channels extending from a region lower than said base portion of said welding cavity to an upper side of said mold, said rising channels having variable cross-sections along their height and being composed of channel portions which are volumetrically matched with said portions of said welding cavity, wherein a volume of said channel portions is direct proportional to a volume of said portions of said welding cavity, said base portion of said welding cavity and said rising channels being connected together, characterized in that a central part of said base portion of said welding cavity extends from a region lower than lateral parts of said base portion of said welding cavity and a central part of said head portion of said welding cavity extends from a region lower than lateral parts of said head portion of said welding cavity, wherein a height between a lower side of said central part of said base portion and a lower side of said central part of said head portion is at least equal to a height between a lower side of lateral parts of said base portion and a lower side of lateral parts of said head portion, said mold in which a moment of inertia of cross-section of said central part of said welding cavity is greater than a moment of inertia of cross-section of said lateral parts of said welding cavity and a height between the lower side of said central part of said base portion and a neutral axis of said central part of said welding cavity is greater than a height between the lower side of said lateral parts of said base portion and a neutral axis of said lateral parts of said welding cavity.

2. A mold according to claim 1 wherein a ratio of a moment of fatigue of cross-section of said central part of said base portion by a moment of fatigue of cross-section of said central part of said head portion is between 0.8 to 1.

3. A mold according to claim 1, wherein a height of a central part of said web portion is approximately equal to a height of lateral parts of said web portion of said welding cavity.

4. A mold according to claim 1, wherein said central part of said base portion extends entirely to an upper side of the lateral parts of said base portion and a height of a central part of said web portion is smaller than a height of lateral parts of said web portion of said welding cavity.

5. A mold according to claim 1, wherein said base portion of said welding cavity and each of said rising channels are connected through at least one connecting duct with a cross-section of elongated shape, said connecting ducts being located symmetrically with respect to a longitudinal axis of said mold and extending at least partially between a lower side and an upper side of extremities of said base portion.

6. A mold according to claim 1, wherein said channel portions matched with said web portion and said channel portions matched with said base portion have identical cross-sections.

7. A mold according to claim 1, comprising closing means of said rising channels located at a lower side of said rising channels, said mold in which the lower side of said rising channels is closed to atmosphere.

8. A mold according to claim 1, wherein an area of cross-section of a channel passage located between consecutive channel portions of each of said rising channels is continuous variable.

9. A mold according to claim 1, wherein said channel portions of each of said rising channels have cross-sections of elongated shape oriented on reciprocal orthogonal directions and the cross-sections of said channel portions matched with said head portion of said welding cavity are oriented on a direction parallel with a longitudinal axis of said mold.

10. A mold according to claim 1, wherein one core is located at an upper side of each of said rising channels and each of said rising channels are connected directly to atmosphere through at least one closing gate, said mold wherein an area of cross-section of a channel passage located between the upper side of said rising channels and said closing gates is continuous variable.

11. A mold according to claim 1, wherein one of said mold parts is located at an upper side of said mold such that at least one inflow gate through which a liquid metal is poured into said welding cavity is located at the upper side of said mold, the upper side of each of said rising channels being connected with the upper side of said head portion of said welding cavity through at least one closing gate, said mold in which ventilating gates connect said head portion directly to atmosphere.

12. A mold according to claim 11, wherein an upper side of said rising channels is delimitated by said mold part located at the upper side of said mold, said mold in which said inflow gate or said closing gates or said ventilating gates being located in said mold part located at the upper side of said mold, whereby the manufacturing process of said mold is simplified.

13. A mold for aluminothermic welding without preheating of similar metal parts, said mold being composed of at least two mold parts which are joined together and having internally employed a centrally-located welding cavity, wherein said welding cavity is configured to accept the metal parts and has a base portion, a web portion and a head portion, said mold further having internally employed at least two rising channels with cross-sections of elongated shape located at extremities of said welding cavity on each side of said welding cavity, wherein said welding cavity is not intersected by vertical projections of said rising channels, said rising channels extending from a region lower than said base portion of said welding cavity to an upper side of said mold, said rising channels having variable cross-sections along their height and being composed of channel portions which are volumetrically matched with said portions of said welding cavity, wherein a volume of said channel portions is direct proportional to a volume of said portions of said welding cavity, said base portion of said welding cavity and said rising channels being connected together, said mold in which ventilating gates connecting an upper side of said head portion directly to atmosphere, comprising closing means of said rising channels located at a lateral side of said rising channels, extending from a lower side of said rising channels to the upper side of said mold, whereby the automated manufacturing process of said mold is simplified.

14. A mold for aluminothermic welding without preheating of similar metal parts, said mold being composed of at least two mold parts which are joined together and having internally employed a centrally-located welding cavity, wherein said welding cavity is configured to accept the metal parts and has a base portion, a web portion and a head portion, said mold further having internally employed at least two rising channels located at extremities of said welding cavity on each side of said welding cavity, wherein said welding cavity is not intersected by vertical projections of said rising channels, said rising channels extending from a region lower than said base portion of said welding cavity to an upper side of said mold, comprising at least one connecting duct connecting said welding cavity with each of said rising channels and extending on vertical from a lower side of said base portion to said head portion of said welding cavity and being located symmetrically with respect to a longitudinal axis of said mold.

15. A mold according to claim 14, wherein said connecting ducts are composed of a plurality of connecting portions separated by horizontal separating means.

16. A mold according to claim 15, wherein a width of said connecting ducts is uniformly increased in a vicinity of said welding cavity upon an entire height of said connecting ducts.

17. A mold according to claim 15, wherein a width of said connecting ducts is between 1:20 to 1:1 of a height of said base portion of said welding cavity at extremities of said base portion.

18. A mold for aluminothermic welding without preheating of similar metal parts, said mold being composed of at least two mold parts which are joined together end having internally employed a centrally-located welding cavity, wherein said welding cavity is configured to accept the metal parts and has a base portion, a web portion and a head portion, said mold further having internally employed at least two rising channels located on each side of said welding cavity and extending from a region lower than said base portion of said welding cavity to an upper side of said mold, extremities of said base portion of said welding cavity and each of said rising channels being connected through at least one connecting duct having a height larger than a width, comprising at least one ventilating duct located on each side of said welding cavity, connecting directly an upper side of said base portion with a lower side of said head portion.

19. A mold according to claim 18, wherein said ventilating ducts are connected on their entire height with said welding cavity through connecting means.

20. A mold according to claim 18, wherein said ventilating ducts are connected on their entire height with said welding cavity through connecting means having a width smaller than a width of said ventilating ducts.

21. A mold for aluminothermic welding without preheating of similar metal parts, said mold being composed of at least two mold parts which are joined together and having internally employed a centrally-located welding cavity, wherein said welding cavity is configured to accept the metal parts and has a base portion, a web portion and a head portion, said mold further having internally employed at least two rising channels located on each side of said welding cavity, said base portion of said welding cavity and each of said rising channels being connected through at least one connecting duct having a width larger than a height, each of said rising channels and an upper side of said head portion of said welding cavity being connected through at least one closing gate, said mold in which one closing core being located at an upper side of each of said rising channels such that said rising channels are closed to atmosphere, comprising at least one ventilating duct located on each side of said welding cavity, connecting directly to atmosphere an upper side of said base portion of said welding cavity, in a region of a vertical projection of extremities of said head portion upon an upper side of said base portion.

22. A mold for aluminothermic welding without preheating of similar metal parts, said mold being composed of at least two mold parts which are joined together and having internally employed a centrally-located welding cavity, wherein said welding cavity is configured to accept the metal parts and has a base portion, a web portion and a head portion, said mold further having internally employed at least two rising channels located at extremities of said welding cavity on each side of said welding cavity, wherein said welding cavity is not intersected by vertical projections of said rising channels, extremities of said base portion of said welding cavity and each of said rising channels being connected through at least one connecting duct having a height larger than a width, comprising at least one recess located on each side of said welding cavity in a region between said base portion and said web portion, symmetrically with respect to a longitudinal axis of said mold and extending partially upon an upper side of said base portion and partially upon a lateral side of said web portion and at least partially upon a width of said welding cavity.

23. A mold according to claim 22, wherein a height of said base portion of said welding cavity is approximately constant or variable increasing from a region of vertical projection of extremities of said head portion upon an upper side of said base portion to extremities of said base portion of said welding cavity, in a region of said connecting duct, a height of said connecting duct being equal with a height of said base portion at the extremities of said base portion.

24. A mold according to claim 23, wherein the extremities of said base portion of said welding cavity and said rising channels are connected by at least two connecting ducts, the height of said base portion of said welding cavity being variable decreasing from a region of vertical projection of the extremities of said head portion upon the upper side of said base portion to the extremities of said base portion, in a region between said connecting ducts and in a region between said connecting ducts and edges of said base portion.

25. A mold according to claim 23, wherein the width of said connecting duct is between 1:28 to 1:1 of the height of said base portion of said welding cavity at the extremities of said base portion.

26. In aluminothermic welding without preheating of similar metal parts, a process including the steps of aligning the metal parts within a mold with a gap therebetween, wherein a welding cavity having a base portion, a web portion and a head portion is centrally employed within said mold, surrounding the gap by a central part of said welding cavity, wherein a height between a lower side of a central part of said base portion and a lower side of a base of said metal parts is approximately equal to a height between a lower side of a central part of said head portion and a lower side of a head of said metal parts, pouring liquid metal into said welding cavity with an incoming flow which is entirely allowed under a force of gravity by an area of cross-section of a plurality of connecting ducts which are connected between said welding cavity and a plurality of rising channels located on each side of said welding cavity and extending below a base portion of said welding cavity, flowing liquid metal to the lower side of the central part of said base portion of said welding cavity, comprising creating a liquid bath in the lower side of the central part of said base portion which firstly reaches the lower side of the base of said metal parts, whereby a heat transfer between the liquid metal and the base of said metal parts is increased and the lower side of the base of said metal parts is melted from center to extremities, Slowing liquid metal through said connecting ducts to said rising channels from a beginning of a pouring operation, creating in said base portion of said welding cavity a liquid bath of constant height in an early stage of the pouring operation, said process wherein a height of liquid bath in said welding cavity increases with a speed inverse proportional with an area of cross-sections of portions of metal parts, filling eventually said welding cavity with liquid metal and employing a weld in which a central part of weld extends from a region lower than lateral parts of weld, wherein a ratio between the moment of fatigue of cross-section of weld base and a moment of fatigue of cross-section of weld head is between 0.8 to 1.

27. A process according to claim 26, wherein the height of said liquid bath in said base portion is between 1:20 to 1:1 of the height of said base portion at extremities of said base portion in an early stage of the pouring operation of liquid metal into said welding cavity.

28. A process according to claim 26, including eliminating of gases which develop in said base portion during the pouring operation of liquid metal into said welding cavity through ventilating ducts extending from an upper side of said base portion, eliminating of gases which develop in said welding cavity through ventilating gates located in the region of said head portion, eliminating of gases which develop in said rising channels through closing gates located at an upper side of said rising channels, said process wherein the liquid metal solidifies when it flows through said closing gates, ventilating gates and ventilating ducts.

* * * * *